Aug. 12, 1969     KIYOSHI INOUE     3,461,268
KINETIC DEPOSITION OF PARTICULATE MATERIALS

Filed April 10, 1967     3 Sheets-Sheet 1

KIYOSHI INOUE
INVENTOR.

BY
Karl F. Ross
Attorney

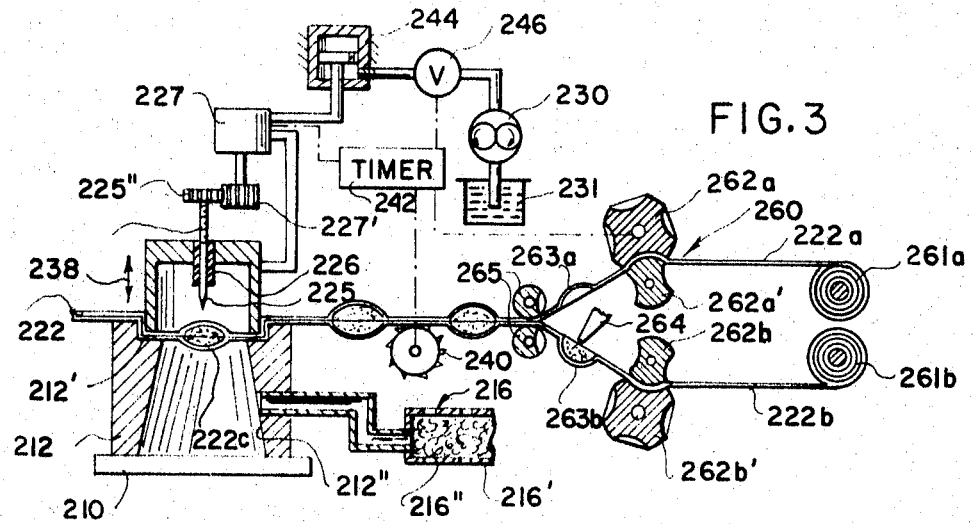
FIG. 3
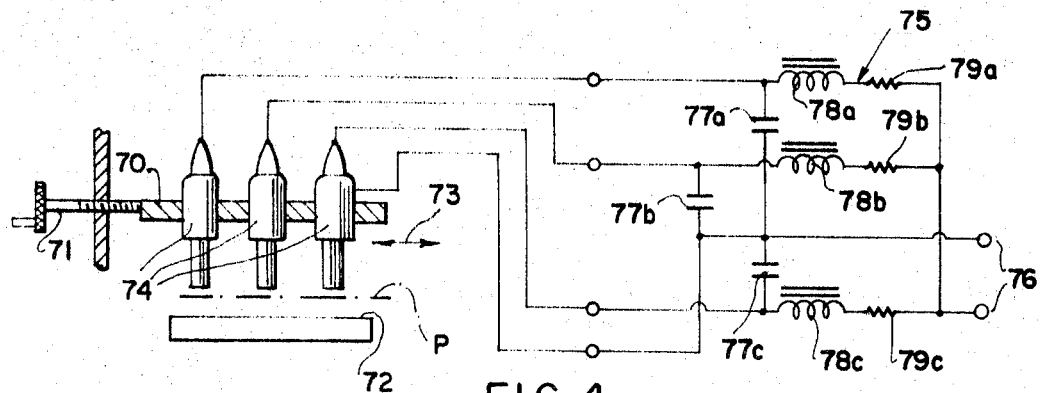
FIG. 4
FIG. 5
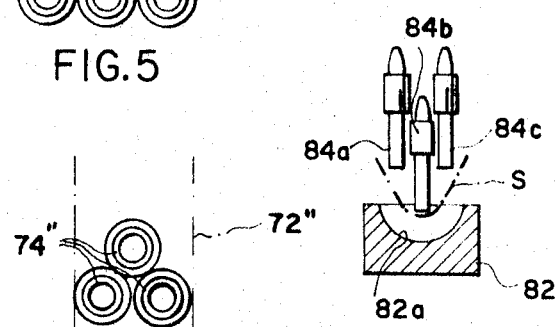
FIG. 6
FIG. 7
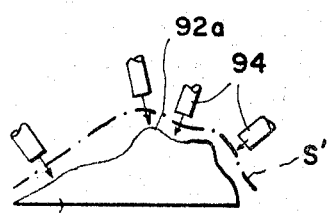
FIG. 8

United States Patent Office 3,461,268
Patented Aug. 12, 1969

3,461,268
KINETIC DEPOSITION OF PARTICULATE MATERIALS
Kiyoshi Inoue, 182 3-chome, Tomagawayoga-machi, Setagaya-ku, Tokyo-to, Japan
Continuation-in-part of application Ser. No. 574,056, Aug. 22, 1966. This application Apr. 10, 1967, Ser. No. 629,633
Claims priority, application Japan, Jan. 24, 1967, 42/6,382; Feb. 16, 1967, 42/12,856
Int. Cl. B23k 9/02
U.S. Cl. 219—76                                    22 Claims

ABSTRACT OF THE DISCLOSURE

Method of and apparatus for the high-energy-rate deposition of particulate materials upon a receiving surface whereby the particles are propelled against the receiving surface with sufficiently high kinetic energy to effect bonding between the particles and the surface. The high-kinetic-energy propulsion of the particles is effected by impulsive spark discharge. Apparatus for the repeated propulsion of unit masses of such particles whereby a belt having a series of encapsulated particle masses is passed intermittently between the discharge source and surface, the belt forming one of the discharge electrodes. A method of making such belt whereby the particles are deposited between metallic foils, at least one of which consists of a material adapted to coat the substrate and form a bonding layer for the particles.

---

This application is a continuation-in-part of my copending application Ser. No. 574,056 (filed Aug. 22, 1966, entitled "Kinetic Deposition of Particles," as a continuation-in-part of then pending application Ser. No. 311,061, now U.S. Patent No. 3,267,710) and my copending application Ser. No. 508,487 (filed Nov. 18, 1965 as a continuation-in-part of application Ser. No. 41,080, now U.S. Patent No. 3,232,085).

My present invention relates to improvements in the method of kinetically depositing particulate materials upon a receiving surface and the coating of such surfaces with layers of materials which may be difficult to bond to the substrate by conventional particle-adhesion techniques and, more particularly, to a method of and apparatus for coating such substrates at high energy rates.

In my copending application Ser. No. 574,056, I point out that metallic substrates and other surfaces which may be coated with particulate materials by conventional thermal sintering techniques only with great difficulty as well as metallic and other substrates which may be coated easily by conventional methods, may receive a surface layer of a pulverulent material conveniently, economically and efficiently when a source of detonation-type impulse waves is juxtaposed with a surface of the body to be coated and between this body and the source, a mass of a pulverulent material is placed (preferably in proximity to the detonation source); the pulverulent material can have a hardness greater than that of the substrate and may even be nonbondable thereto by conventional methods.

The detonation-type wave generated by the source drives the particles onto the substrate with a velocity (and kinetic energy) sufficient to cause the particles to lodge thereon with a firm bond between the layer and the substrate.

The technique is particularly advantageous when applied to the bonding of particles of a hard-facing material (e.g. tungsten carbide) or hard alloy steels to metallic, synthetic-resin or like substrates. Preferably, the particulate material is a layer of powder disposed upon or in a frangible foil, film or sleeve juxtaposed with the surface to be coated and forming a rupturable diaphragm retaining the particle layer and separating a "discharge chamber" from the workpiece chamber. The latter is vented to the atmosphere via a sound-damping muffler to prevent the development of substantial outward pressures within the workpiece chamber resisting the kinetic movement of the particles and to prevent the violent sound wave from becoming a nuisance to workers in the region of the apparatus.

It was observed that the use of a frangible diaphragm to retain the particles in this manner facilitates the uniform deposition of the particles upon the surface, especially when the diaphragm is generally parallel to the surface of the substrate to be coated or conforms to the latter. Moreover, the diaphragm constitutes the counterelectrode for a spark-discharge system forming the detonation source. The other discharge electrode is a needle spaced from and perpendicular to the frangible diaphragm.

It is especially convenient to provide the discharge chamber as a "gun" or shock tube whose barrel is trained upon the workpiece and receives, at an intermediate location, a mass of particles to be propelled against a surface of the substrate. In a horizontal position of the barrel, the particles can be introduced substantially continuously between the discharge chamber and the mouth of the barrel while a rapid train of pulses is supplied across the electrodes so that the resulting sequence of discharges impart intermittent but repeated high-energy-rate propulsion of the particles toward and against the workpiece surface. In vertical positions of the barrel, it has been found that it is advantageous to provide frangible foil-type diaphragms as a support for the pulverulent material, the latter merely resting upon the former. The needle electrode is best constituted of aluminum, zirconium, magnesium and copper (in this order of preference) since these materials appear to impart greater kinetic energy to the particles when used as discharge electrodes. Correspondingly, foils of aluminum, zirconium, magnesium, copper and nickel have been found to be effective as counterelectrodes.

Furthermore, means may be provided for heating the particles to a temperature less than their fusion point but relatively elevated with respect to ambient temperature and, if possible, above the softening temperature of the substrate (e.g. a thermoplastic synthetic resin) whereby an improved bond between the coating material and the substrate is obtained. Such heating means can provide for the passage of a heating current through the mass of particles in advance of the discharge, the use of externally operable electric heating means, the mixing with the particles to be deposited of a reducing agent so that a thermite-type reaction occurs during impulsive propulsion of the mass in the direction of the substrate to raise the temperature of the particles. It has been found that the incorporation of a redox (reduction-oxidation) reaction system in the particulate mass is highly effective since the reactant tends to remain in a quiescent state until the generation of a spark discharge; the quiescent state terminates very shortly after the generation of the discharge and initiates the heating reaction slightly before or concurrently with the acceleration of these particles and their dispersion so that they are heated without significant interparticle fusion until they again accumulate upon the surface of the substrate.

As I have emphasized in my application Ser. No. 574,056, it is believed that part of the surprising bonding results obtained by the use of spark generators as the source of impulsive energy derives from the stripping of oxide layers on the surfaces of the particles or the destruction of bond-resistant surface skins on these layers. Thus-practically all metallic particles have an oxide or other bond-resistant skin which limits interparticle bonding as well as particle-to-substrate adhesion to such an extent that high temperatures and/or the presence of reducing agents have hitherto been required to obtain satisfactory bond strengths; the use of a spark-type detonation source, however, produces an electric discharge in the region of the particles and appears to have a similar effect in stripping the oxide layers and piercing the bond-resistant surface skin.

Various methods of initiating the discharge can be employed according to my prior discoveries in connection with deposition with high kinetic energies, the preferred method involving changes in the electrical parameters of the discharge system. Thus, the needle electrode can be advanced toward the foil to reduce the wheel of the discharge gap and, effectively, reduce the voltage needed for breakdown thereof. In this system, an external pulse source is not required for the generator and the discharge capacitor may merely be charged to a potential which is sufficient, upon advance of the needle, to effect breakdown in the gap when the desired width is attained. Alternately, or in addition, the ionization condition within the discharge compartment may be simply modified to reduce the potential required for breakdown in the gap. This may be done by directing a stream of compressed air into the chamber to produce a cloud of conductive particles, or by evacuating the region of the gap to lower the breakdown potential. The invention as described can be used to deposit tantalum or titanium upon an aluminum foil to form capacitor plates, to deposit gold or aluminum upon a silicon wafer to form semiconductive components, and to deposit lead sulfide or cadmium sulfide upon conductive or semiconductive substrates to produce photoconductive cells.

The main object of the present invention is to provide a method of and an apparatus for the kinetic deposition of particles and the coating of substrates, which represents an improvement over and an extension of the principles of my above-mentioned copending applications and the patents issuing thereon.

A more specific object of this invention is to provide an improved apparatus for the impulsive coating of various substrates whereby the character of the bond formed between the coating and the substrate is improved, the energy efficiency (in terms of quantity of coating material bonded per unit of energy consumption) is increased, and greater control over the deposition process and the nature of the deposit can be obtained.

Another object of this inventon is to provide an improved technique for the coating of substrates with particulate material at high energies, whereby the apparatus is rendered less complex, a higher depositon rate can be obtained, and the system employed for coating surfaces at various locations.

Yet another object of the present invention is to provide an improved method of and apparatus for the high-energy-rate deposition of particulate material on relatively complex contoured surfaces.

I have observed that, when the particulate material is to be applied to the substrates by a high-energy-rate deposition apparatus or "gun," according to the invention, there is frequently a loss of efficiency and control by virtue of the fact that the particulate materials often are dispersed by the shock wave prior to rupture of the foil. Consequently, the particles may be dispersed within the shock-generating chamber and be partly propelled in directions other than that which is intended. To avoid this disadvantage, and to increase the rate at which the shock-wave chamber can be supplied with the particulate material and the reproducibility of such supply, I advantageously provide a foil with a multiplicity of pockets, each enclosing a predetermined quantity of the particulate material, the pockets being successively aligned with the shock-wave generator and supplied to the latter in the form of a belt.

According to a further feature of this invention, the particulate material is pocketed between a pair of metallic foils which thus form a laminate as well as counter-electrodes for juxtaposition with a needle electrode. The apparatus thus may be provided with a barrel portion and a shock-wave generator portion, these portions being separable to receive the pocketed foil between them. Advantageously, the portions are provided at their junction with sealing means cooperating with the foil so that the latter simultaneously forms a pressure-retaining and self-locking sealing joint.

I have found further that it is advantageous to employ as the pocketing foil or foils, one or more materials which are intended to be found subsequently upon the coated surface. It is particularly desirable to use for the foil material a substance which is readily bondable both to the particles and to the substrate inasmuch as a substantial portion of this foil is present at the interface between the particles and the substrate. For example, it has been found to be advantageous to employ a nickel foil when tungsten carbide or like hard-facing material is to be bonded to steel or the like. It appears that the nickel acts as a bonding layer between particles of the hard-facing material and of the substrate and derives from the foil originally employed to retain the particles. While loose masses of such particles have been proposed as being retained within a pair of foil layers in respective pockets, it is also conceivable to lightly sinter or adhesively bond respective masses of particles in molded masses along a continuous foil and to the latter. The interparticle bond should, of course, be as little as possible so as to conserve the shock-wave energy and utilize the maximum energy for implanting the particles into the substrate.

According to a further feature of this invention, a contoured cavity or other surface is coated with particulate materials by juxtaposing with this surface an array of shock tubes or guns, extending transversely to the surface regions confronting them, but oriented so that their mouths define a surface generally parallel to that of the workpiece.

The above and other features and advantages of this invention will become more readily apparent from the following description, reference being made to the accompanying drawing in which:

FIG. 3 is a view generally similar to FIG. 1 of a system wherein the doses of particles may be formed concurrently with the coating;

FIG. 4 is a diagrammatic elevational view with accompanying circuit diagram of an apparatus for uniformly coating relatively broad flat surfaces according to this invention;

FIG. 5 is an elevational view of a multi-tube array of the type shown in FIG. 4;

FIG. 6 is a view similar to FIG. 5 of another array;

FIG. 7 is an elevational view in diagrammatic form of a system for the coating of a convex surface;

FIG. 8 is a diagram illustrating a further modification of an apparatus for coating convex surfaces of complex configuration;

Figure 1:
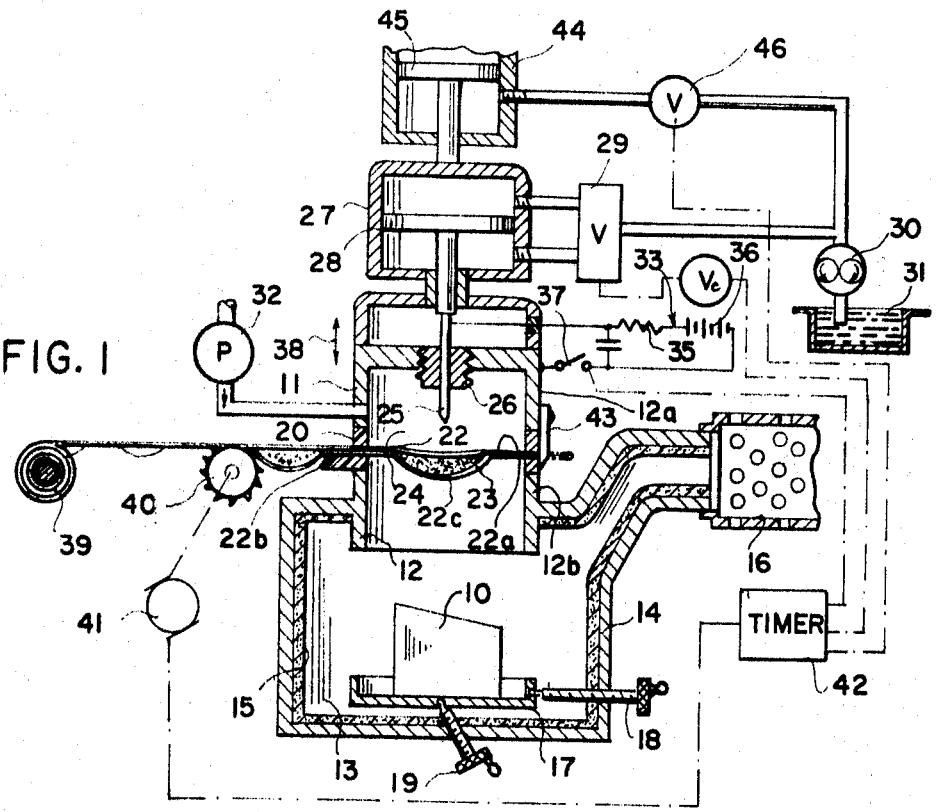
FIG. 1 is a diagrammatic cross-sectional view illustrating an apparatus for the coating of surfaces according to the present invention.

As described in the aforementioned copending application, Ser. No. 574,056, the basic apparatus for the high-energy-rate coating of a workpiece 10 comprises a shock tube or gun 11 whose barrel 12 extends into a coating chamber 13 of a housing 14, the coating chamber 13 being lined with a sound-damping elastomeric material 15 such as foam rubber. The chamber 13 is vented through a muffler 16 of the automotive-vehicle or internal-combustion engine type for limiting the intensity of the sound wave transmitted to the atmosphere. Chamber 13 is, moreover, provided with a cross-feed carriage 17 for the workpiece 10, designed to position the workpiece 10 selectively in the path of the particles emerging from the barrel 12. The cross feed 17 includes spindles 18 and 19 for the longitudinal and transverse displacement of the carriage 17 and the workpiece 10 from locations outside the chamber 14.

The upper part of the barrel 12 is separable at the insulating seat 21 of the lower barrel portion 12b. The foil 22 carrying the particulate material 23 is disposed within, and partly defines, the spark chamber 24 in which the shock wave is generated. For this purpose a needle electrode 25 passes through an insulating bushing 26 and is connected with a pulse-generating electric-current supply network as illustrated only diagrammatically here but as is fully described in the aforementioned copending application Ser. No. 574,056. The firing control of the system may be regulated by a hydraulic motor 27 (i.e. a piston-and-cylinder arrangement) whose piston 28 is connected with the electrode needle 25 for hydraulically advancing same toward the foil. A distributing valve 29 in a fluid circuit with the pump 30 and a reservoir 31 provide the necessary regulation of the position of the motor 27. Upon the application of a static voltage across the foil 22 and the needle 25, the latter can be advanced until the gap is so narrow that the potential suffices to break down the gap and a spark discharge bridges same. The discharge results in rupture of the foil diaphragm 22 and the propagation of the particles 23 against the workpiece 10. The discharge can also be initiated by a compressed-air source 32 designed to blow a high-velocity stream of air-entrained particles into the chamber 24 to effect the breakdown between the electrode 25 and the foil 22 without advance of the needle electrode.

The energizing circuit 33 includes a discharge capacitor 34 connected between the electrode 25 and the housing portion 12a which makes electrical contact with the foil 22. The condenser 34 is charged through a resistor 35 via a battery 36 and may be discharged across the gap via a switch 37. The latter may represent any electronic breakdown device (e.g. thyratron or solid state controlled rectifier) or other switching means capable of sustaining the capacitor potential and current surge. When the hydraulic motor 27 is inactivated and air is not blown into the chamber 24 to initiate discharge, the spark may be produced on closure of this switch 37.

According to an important feature of this invention, the separable barrel 12 has its lower portion 12b integrally formed or affixed to the housing 14 while the upper portion 12a is shiftable in the direction of arrow 38 alternately toward and away from the lower barrel portion 12b. In its lower position, the upper barrel portion 12a clamps the foil 22 against the bottom barrel portion so that the upper chamber 24 is hermetically sealed and substantially all of the shock-wave energy in this chamber is transmitted axially to the frangible diaphragm 22. The latter consists of a generally flat upper layer 22a and a pocketed lower layer 22b in which longitudinally spaced pouches or pockets 22c are formed. When the pockets 22c are filled with a pulverulent material 23 to be deposited, the foils are brought together and may be thermally fused (e.g. by welding) or may have their longitudinal edges rolled together to fully retain the respective doses of the particulate material. In this embodiment, the upper layer 22a is shown to be concave toward the discharge needle 25 and convex toward the workpiece 10, although of a radius of curvature substantially greater than that of the pocket 22c. The convexity described above appears to promote sufficient transfer of shock-wave energy to the particulate material within the pouch.

The foil 22 is carried upon a supply roll 39 and can be intermittently advanced into the barrel 12 when the upper barrel 12a is raised by a sprocket 40 whose motor 41 is operated for predetermined intervals by a timer 42. Thus, when the upper barrel portion 12a is raised, the motor 41 and sprocket 40 advance a predetermined length of the foil 22 into the barrel and shift any remnant of the ruptured pocket of the foil out of the system. On the discharge side of the system, the upper barrel portion 12a is provided with a blade 43 which severs the damaged portion of the foil from that remaining.

The vertical movement of the upper barrel portion 12a is removed, and a workpiece 10 mounted upon the carriage 17 and positioned in axial alignment with the fixed lower barrel portion 12b via the spindles 18 and 19. An initial length of foil 22, from the supply roll 39, is placed on the lower barrel portion 12b with its convex pocket side turned downward. The upper barrel portion 12a is thereupon replaced and the source 33 is reconnected. Timer 42 can thus close switch 37, while the upper barrel portion 12a is clamped tightly against the foil 22 and produces a spark discharge between the needle 25 and the upper foil layer 22a. The resulting impulsive wave ruptures, in short order, the upper and lower layers 22a and 22c, while propelling the particulate material 23 at high velocity and high kinetic energy against the surface of the body 10 to be coated. Thereafter, timer 42 deenergizes the electrode 25 and activates the valve 46 to raise the upper barrel portion 12a and cause the sprocket 40 to advance the foil by a corresponding length to receive a successive filled pocket of the foil. It will be understood that, instead of, or in addition to, the switch 37, the motor 27 or the valve 29 for the air jet may be activated to initiate the breakdown.

Figure 2:
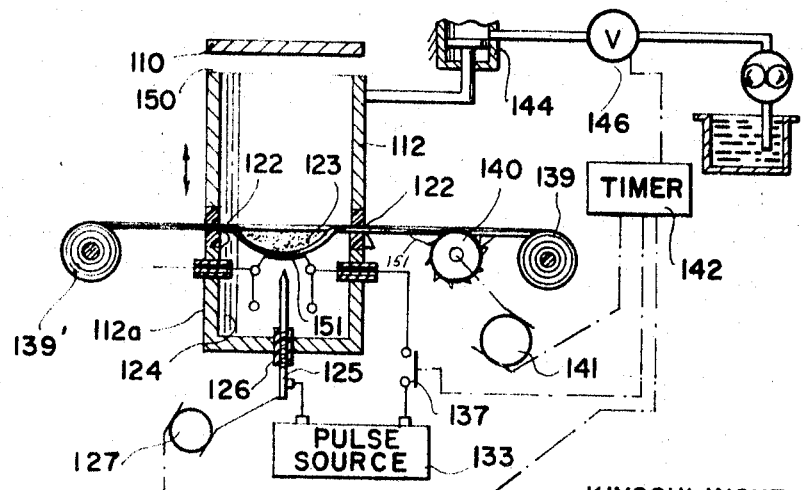
FIG. 2 is an axial cross-sectional view of another embodiment of a coating apparatus according to this invention.

In the system of FIG. 2, the barrel 112, trained upon the carbon-steel band 110 with a clearance 150 to prevent excess static-pressure buildup in the barrel, is provided with feed means including a supply roll 139 for a foil 122 of a conductive or nonconductive material. Pockets 123 are formed in the foil as described with respect to FIG. 1 with longitudinal equispacing. The discharge chamber 124 is formed, at least in part, by a barrel portion 112a which can be advanced by a hydraulic motor (see FIG. 1) or an electric motor as represented at 127. Here, the pockets 123 can rest upon a basket-shaped counterelectrode 151 just behind the foil 122 and contacting the latter. A basket electrode of this type is fully described in application Ser. No. 574,056.

When a current source 133 of the type shown in FIG. 1, for example, is connected across the needle electrode 125, which is shiftable in its sleeve 126, closure of switch 137 will apply a current surge across the gap and effect spark discharge between the needle electrode 126 and the basket electrode 151. Switch 137 also is controlled by a timer 142 which operated a valve 146 of a hydraulic cylinder 144. The piston of this cylinder is connected to the upper barrel portion 112a so that this member can be raised and lowered to release and clamp the foiled sections 122. Motor 127 is likewise operated at a cadence determined by the timer 142. In this system, a sprocket 140 and drive 141, likewise controlled by timer 142, advance the foil 122, while a takeup roll 121' collects the ruptured portions of the foil for salvage, if desired. The foils preferably are of a thickness no greater than 0.01 and 0.02 mm.

Example

Using an apparatus of the type illustrated in FIG. 2, a pocketed foil 122 was formed from a pair of foil layers having a thickness of about 0.006 mm., with the pocket sufficient to enclose 5 grams of a particle mixture per pocket (see FIG. 3). The mixture was made of equal proportions, by weight, of 300 mesh tungsten carbide and 600 mesh synthetic diamond. The gun 112 was held stationary, while a carbon-steel band 110 was moved above the barrel, the workpiece being composed of carbon steel (0.55% by weight carbon) of the designation S55C. The surface to be coated was located at a distance of 12 mm. from the foil. Discharge energies of about 8000 joules per pocket were applied and the foil advanced at an intermittent rate identical to the intermittent rate of advance of the workpiece. The coated surface was found to consist of approximately 80% by weight of all of the particles employed in a highly adherent layer. Corresponding results were obtained when the particles were composed of silicon carbide, aluminum nitrate, boron nitrate and titanium carbide. When the workpiece was an aluminum foil, it was found that titanium and tantalum particles could be readily applied to the surface of this foil with the same discharge energy and device. There was no need for any binder in the particle mass and the coating was found to be more uniform and of greater strength than that produced when the particles were merely placed upon the foil and not encapsulated therein.

A somewhat greater penetration of the particles was observed when stoichiometrically equivalent quantities of chromic oxide (oxidant) particles and cellulose particles (reducing agent) were incorporated in the mass within each pocket in an amount up to 10% by weight. It appears that the exothermic chemical reaction between the chromic oxide and the cellulose generates sufficient heat to increase the surface energy of the particles and the degree to which they are bonded to the substrate.

In FIG. 3, I show a modified system for the high-rate coating of a substrate 210. In this system, the barrel or tube 212 is generally cylindrical and is formed with a seat 212' at its upper end at which a frustoconical inner bore 212" terminates. The barrel 212 is provided with an exhaust muffler 216 of the type illustrated and described with respect to FIG. 1 and advantageously consisting of a tube 216' filled with a packing 216" of stainless steel wool or other sound-damping material. An upper member 224 forms a shock-wave generator and is provided with a needle electrode 225 in an electrically insulated ceramic sleeve 226. The needle electrode 225 is threaded at its upper extremity 225' and engages a nut 225" whose toothed periphery meshes with a pinion 227' of an electric motor 227. The housing 224 and motor 227 are connected together and are shifted in the direction of arrow 238 by a hydraulic cylinder 244. The latter is operated by a valve 236 and receives hydraulic fluid from a pump 230 and a reservoir 231. A timer 242 is provided to operate the valve 246 and lift the barrel 224 from the seat 212' against which it clamps the foil 222. Timer 242 also is coupled with the sprocket 240, representing the means for advancing the foil 222 intermittently to dispose the pockets 222c in the barrel.

The foil 222 may be paid off a supply roll as described in connection with FIGS. 1 and 2 or can be formed concurrently by an encapsulating device 260. This apparatus can, of course, be employed independently of a coating apparatus to prepare the foil for coiling and subsequent use. The system basically comprises a pair of supply rolls 261a and 261b from which nickel, aluminum or other metal foil having a thickness ranging between substantially 0.005 and 0.02 mm. and a width slightly in excess of that of the seat 212' of the apparatus in which the pocketing band is to be used, the foil layers passing between forming rolls 262a, 262a' and 262b, 262b', respectively, in which pockets 263a and 263b are respectively formed in the foils 222a and 222b to register and open toward one another. When the apparatus 260 is to be employed for the production of pocketed foils of the type illustrated in FIGS. 1 and 2 only, a single set of forming rollers is necessary and the rollers 262b and 262b' may be dispensed with.

A feed means 264 with any conventional metering device deposits the particulate material in the pockets thus formed as the foils are brought together and encapsulates the masses via a pair of sealing rollers 265. The sealing rollers 265 may be heated to weld the foils together about the pocket or may merely apply sufficient pressure to laminate them together. It is also possible to use a crimping arrangement at these rollers to fold the edge portions of one foil around the other and thereby encapsulate the particulate material. The metering device 264 and the rollers 262a etc. are operated in the cadence of the foil-advancing means 240 and the barrel 224 by the timer 242. Otherwise, the apparatus operates in the manner previously described with reference to FIG. 1.

FIGS. 4 through 8 illustrate various modifications and arrangements of the spark-activated coating gun of the present invention. In FIG. 4, for example, three guns of the general type illustrated in FIGS. 1 through 3, supplied with foil-encapsulated pockets of particulate material from respective supply rolls and energized in succession, are mounted upon a carriage 70 which may be shifted by a spindle 71 parallel to the workpiece surface 72 in the direction of arrow 73. All of these deposition guns or tubes 74 have similar spark chambers and, when the surface 72 is flat, have their mouths lying along a plane P parallel to the receiving surfaces of the substrate. The means for energizing the coating gun 74 can include a circuit such as that illustrated at 75. This circuit, whose terminals 76 are supplied with direct current, includes respective capacitors 77a, 77b and 77c energized respectively via chokes 78a, 78b and 78c and charging resistors 79a, 79b and 79c. The parameters of this network can be such that the left-hand tube 74 (FIG. 4) is energized an instant prior to the energization of the intermediate tube which, in turn, is energized shortly in advance of the right-hand tube 74 as the workpiece 72 is shifted to the left. In this manner, it is possible to move the workpiece with considerable rapidity and apply a relatively thick coating in short order. FIGS. 5 and 6 show several modifications of the orientation of tubes 74. In the system of FIG. 5, the tubes 74' are aligned in a common vertical plane and thus may extend over the full width of a body such as that diagrammatically illustrated at 72'. In the system of FIG. 6, the shock-tubes 74" are arrayed at the vertices of a triangle and may serve to coat a narrower workpiece 72".

When, however, the workpiece 82 has a relatively complicated contoured surface 82a to be coated with the particulate material, I have found that it is most desirable to employ a number of spark-operated deposition guns 84a, 84b and 84c energized by a circuit such as that shown in FIG. 4, and disposed so that the mouths of these guns lie along an imaginary surface S which is generally parallel and complementary to the surface 82a.

In the modification of FIG. 8, the contoured surface 92a of the workpiece 92 has a positive curvature for the most part, i.e. is convex, the deposition guns 94 being disposed along axes perpendicular to tangents to the surface and thus are perpendicular to these surfaces as well. The guns are spaced as closely together as possible with the illustrated spacing being somewhat exaggerated. Moreover, the mouths of the guns are at identical distances from the confronting surface portions so that they lie generally along an imaginary complementary surface S'. When more than three guns are employed, the energization circuit can include a delay line for firing the guns in any desired sequence or rate at each cycle. Furthermore, while a timer means has been described in connection with FIGS. 1 through 3 and is of course employed in the circuit of each of the guns of FIGS. 4 through 8, it will be understood that such timer means can be triggered by a previous discharge in the shock-wave chamber with a predetermined delay time controlled by the charging of the condensers to their respective capacities.

Figure 11:
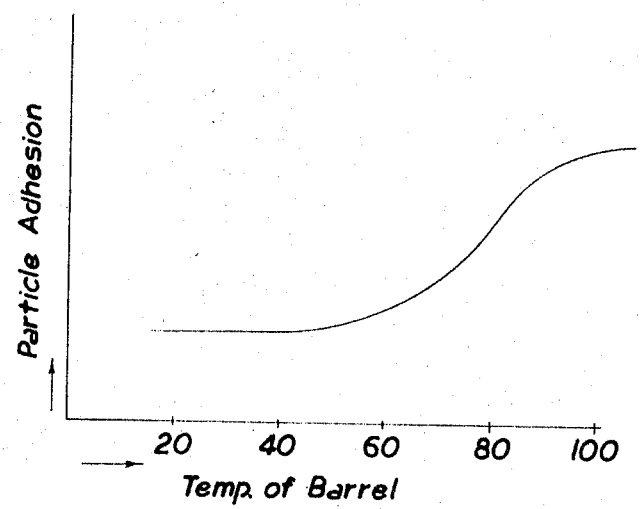
FIG. 11 is a graph showing the relationship between barrel temperature and particle adhesion to the barrel.

According to another aspect of this invention, the impact deposition barrel is provided with cooling means to promote the transfer of powdered materials to the substrate and minimize particle adhesion to the barrel. Thus, in FIG. 11, there is plotted the temperature of the barrel along the abscissa in degrees centigrade while the percent particle adhesion to the internal surface of the barrel is plotted along the ordinate. From this relationship it will be apparent that particle adhesion remains relatively low at temperatures up to about 60° C. but lies sharply between 70° and 80° C., prior to leveling off at relatively high values at still more elevated temperatures. Since particle adhesion to the internal surface of the barrel is inversely proportional to the number of particles delivered to the surface to be treated and to the period of time for which the device can be used effectively without cleaning it, will be evident that operation of the system at lower temperatures produces considerable advantages and promotes efficient operation especially when repeated discharges are to be produced.

Therefore, I have found it to be advantageous to provide cooling means along the barrel for promoting the dissipation of heat therefrom. While this cooling means can include a heat sink in contact with the metallic barrel, i.e. or relatively large heat capacity and high thermal conductivity or a radiator surface making use of convection currents to effect fluid-solid heat transfer, I prefer to provide a forced fluid transfer of heat since the amount of heat energy generated by the high-energy-rate deposition apparatus requires relatively high heat transfer efficiency and capability.

Figures 9, 10:
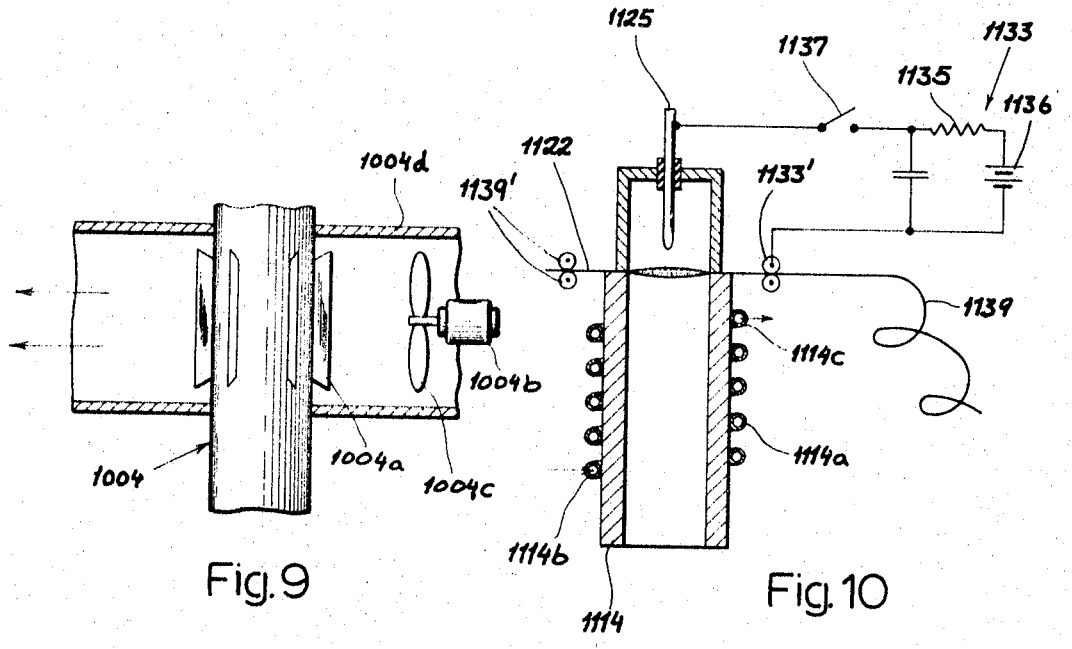
FIG. 9 is an enlarged detail view, partly in cross-section, of the cooling means for an impact deposition barrel according to an aspect of this invention.
FIG. 10 is a diagrammatic cross-sectional view of another apparatus for practicing this invention using other cooling means.

In FIG. 9 I show a system in which the barrel 1004 of a deposition device of the type illustrated in FIGS. 2–8 is provided with radial fins 1004a around which a fan 1004b displaces a forced stream of air. Any air displacement means can be used for this purpose although the fan 1004b is here shown to have a propeller-type blade 1004c. I have found it to be advantageous to confine the cooling fluid in a duct 1004d which encloses the finned region of the barrel 1004 and prevents the high-velocity cooling-air stream from inconveniencing the particle deposition system of this barrel or any adjoining barrels (see FIGS. 4–8).

A modified arrangement with the same purpose is illustrated in FIG. 10 in which the barrel 1114 of a thermally conductive material is in contact with a cooling coil 1114a whose inlet and outlet 1111b and 1114c, respectively, are connected in a fluid-circulation system of any convenient type. The foil 1122, into which the particles are pocketed, may be passed through the system via the displacement means 1139' as shown in greater detail in FIGS. 1–3, while the central electrode 1125 effectuates discharge between the foil and itself. The pulse-supplying source 1133 includes a pair of roller contacts 1133' engaging the foil 1122 downstream of the suppy coil 1139. The source comprises a battery 1136 which charges the capacitor through a resistor 1135 while the switch 1137, upon closure, applies the impulsive discharge to the electrode. The cooling means of FIGS. 9 and 10 are dimensioned to maintain the barrel temperature below 80° C. and preferably below 60° C.

It has been found that in addition to the foil materials described above and illustrated in FIGS. 1–3 and 10 to form pocketed magazines for the particles, it is possible to make use of cobalt, copper-nickel alloys and iron-foil materials with thicknesses as previously indicated. When, however, the discharge is produced between a pair of electrode independently of the foil, e.g. as described in the above-identified copending application, the foil material can be a synthetic resin such as polyethylene or polyvinyl resin.

The invention described and illustrated is believed to admit of many modifications within the ability of persons skilled in the art, all such modifications being considered within the spirit and scope of the appended claims.

I claim:
1. A method of depositing a particulate material upon a substrate, comprising the steps of:
juxtaposing a pair of electrodes in spaced relationship to form an impulse generator;
successively disposing masses of a pulverulent material on a rupturable foil between said generator and said substrate; and
intermittently energizing said electrodes upon the positioning of the successive masses of said material in force-receiving relationship therewith to generate respective impulsive spark discharges between said electrodes of an intensity sufficient to propel said pulverulent material against said substrate.

2. The method defined in claim 1 wherein said masses of pulverulent material are encapsulated between rupturable metallic foils to form a band having spaced-apart pockets containing said puverulent material, and wherein the foil remote from said substrate forms one of said electrodes, said method further comprising the steps of clamping said band against said impulse generator to hermetically seal said electrodes in said generator during said discharge therein; releasing said band subsequent to the rupture of said foils and the propulsion of said material against said substrate; and advancing said band to dispose a further pocket of said material in force-receiving relationship with said generator upon a subsequent discharge therein.

3. The method defined in claim 2, further comprising the step of advancing said band at a rate sufficient to intermittently dispose said pockets in force-receiving relationship with said generator at the cadence of the spark discharge generated between said electrodes.

4. The method defined in claim 2 wherein said foil is composed of aluminum, nickel, cobalt, copper, copper-nickel alloy or iron.

5. The method defined in claim 1 wherein said masses of pulverulent material are encapsulated between synthetic-resin foils to form a band having spaced-apart pockets containing said pulverulent material, further comprising the steps of clamping said band in said impulse generator to hermetically seal said electrodes in said generator during said discharge therein; releasing said band subsequent to the rupture of said foils and the propulsion of said mass against said substrate; and then advancing said band to dispose a further pocket of said material in force-receiving relationship with said generator upon a subsequent discharge therein.

6. The method defined in claim 1, further comprising the steps of forming said masses of said material into coherent bodies prior to the disposition thereof between said generator and said substrate.

7. The method defined in claim 6 wherein said masses of particulate material are mechanically compacted to form coherent bodies therefrom.

8. The method defined in claim 6 wherein said masses of said material are lightly sintered to coherency prior to their disposition between said generator and said substrate.

9. The method defined in claim 6 wherein said masses are rendered coherent by admixing an adhesive with said particulate material.

10. The method defined in claim 1 wherein a barrel is disposed forwardly of said generator in the direction of propulsion of said pulverulent material against said substrate, further comprising the step of cooling said barrel to maintain the latter at a temperature below substantially 80° C. during the deposition of the particulate material upon said substrate.

11. An apparatus for depositing a pulverulent material upon a substrate, said apparatus comprising:
housing means having at least two axially aligned tubular portions directed toward said substrate and including a first portion relatively remote from said substrate and a second portion relatively proximal to said substrate;

an impulse generator including at least one spark-discharge electrode in said first portion;

means for advancing a band of frangible sheet material containing spaced-apart pockets of said pulverulent material between said first and second portions and in force-receiving relationship with said generator; and circuit means for energizing said generator by applying to said electrode an electric pulse of an intensity sufficient to generate an impulsive spark discharge within said generator having an energy sufficient to rupture said band and propel the particles of said material into bonding engagement with the substrate.

12. An apparatus as defined in claim 11 wherein said band is electrically conductive and is connected with said circuit means, said electrode extending within said first portion transversely to said band for generating said discharge between said band and said electrode.

13. An apparatus as defined in claim 11, further comprising drive means for axially shifting at least one of said portions relatively to the other of said portions to clamp said band between said portions.

14. An apparatus as defined in claim 13, further comprising means for advancing said band in step with the operation of said drive means to alternately release said band and engage the latter, and in step with the energization of said electrode whereby successive pockets of said band are ruptured and the respective masses of material are propelled toward its substrate.

15. An apparatus as defined in claim 11 wherein said housing means includes a deposition chamber at least partly containing said substrate and said second portion opens into said chamber, said apparatus further comprising sound-damping muffler means venting said chamber.

16. An apparatus as defined in claim 11 wherein said electrode is a needle and said circuit means includes a capacitor connected with said electrode and dischargeable therethrough upon the advance of said needle toward said band, said apparatus further comprising control means connected with said electrode for shifting same toward and away from said band substantially at a cadence of advance of said band between said portions.

17. An apparatus as defined in claim 11, further comprising means adjacent said band for encapulsating said pulveruent material in respective pockets thereof prior to the passage of said band between said portions.

18. An apparatus as defined in claim 17 wherein the last-mentioned means comprises feed means for advancing a pair of foils into juxtaposed relationship, forming means for impressing a pocket in at least one of said foils, and metering means for depositing in said pocket respective masses of said pulverulent material, whereby said foil encapsulates said masses in said pocket.

19. An apparatus as defined in claim 11 wherein said second tubular portion between said generator and said substrate forms a barrel for directing said particles against said substrate, further comprising cooling means for maintaining the temperature of said barrel below a predetermined level.

20. An apparatus as defined in claim 19 wherein said cooling means includes a liquid-flow cooling coil surrounding said barrel.

21. An apparatus as defined in claim 19 wherein said cooling means includes a multiplicity of fins provided on said barrel and means for displacing a cooling fluid past said barrel into heat-exchanging contact with said fins.

22. An apparatus for depositing a pulverulent material upon the surface of a substrate, comprising an impulse generator spaced from said surface, a barrel aligned with said impulse generator and trained upon said surface, means for supporting a mass of said material between said generator and said surface at an end of said barrel remote from said surface, and cooling means for maintaining the temperature of said barrel below a predetermined level.

References Cited
UNITED STATES PATENTS 3,371,404    3/1968    Lemelson _____ 29—421

JOSEPH V. TRUHE, Primary Examiner

C. L. ALBRITTON, Assistant Examiner

U.S. Cl. X.R.

118—49